United States Patent [19]

Wakamatsu et al.

[11] 4,197,326

[45] Apr. 8, 1980

[54] PROCESSED MEAT PACKAGING TUBE AND METHOD OF PACKAGING

[75] Inventors: Shigehiro Wakamatsu; Takashi Abe, both of Nagahama, Japan

[73] Assignee: Mitsubishi Plastics Industries Limited, Tokyo, Japan

[21] Appl. No.: 932,016

[22] Filed: Aug. 8, 1978

[30] Foreign Application Priority Data

Jul. 22, 1978 [JP] Japan .................................. 53/89694

[51] Int. Cl.$^2$ ........................ A23B 4/10; B65B 55/02; A22C 21/00; B32B 27/06

[52] U.S. Cl. ........................................ 426/412; 17/49; 138/118.1; 426/413; 426/414; 426/415; 426/127; 428/475; 428/476; 428/483; 428/515; 428/516; 428/36

[58] Field of Search .......................... 17/49; 138/118.1; 428/475.8, 476.1, 483, 515, 516, 36; 426/412, 413, 414, 415, 127

[56] References Cited

U.S. PATENT DOCUMENTS

| | | | |
|---|---|---|---|
| 3,423,231 | 1/1969 | Lutzmann | 428/474 |
| 3,595,740 | 7/1971 | Gerow | 428/474 |
| 3,669,692 | 6/1972 | Turbak | 138/118.1 |
| 3,753,828 | 8/1973 | Manne et al. | 428/483 |
| 3,826,676 | 7/1974 | Heling et al. | 138/118.1 |
| 3,840,427 | 10/1974 | Brazier et al. | 428/474 |
| 3,925,591 | 12/1975 | Breitenfellner et al. | 428/483 |
| 3,997,383 | 12/1976 | Bieler et al. | 428/516 |
| 4,064,296 | 12/1977 | Bornstein et al. | 428/515 |

*Primary Examiner*—William R. Dixon, Jr.
*Attorney, Agent, or Firm*—Oblon, Fisher, Spivak, McClelland & Maier

[57] ABSTRACT

A processed meat packaging tube is a tube of an orientated laminated film having more than 5% of a shrinkage coefficient at 80° C., less than ±5% of percent elongation-shrinkage at 80° C. under tensile modulus of 20 Kg/cm$^2$ and more than 8 Kg/cm$^2$ of tightening modulus at 5° C. and more than $1.0 \times 10^3$ Kg/cm$^2$ of a tensile modulus of elasticity at 80° C. which is formed by stretching a composite film having an inner layer made of an oxygen barrier thermoplastic resin having less than $1 \times 10^{-11}$ cc·cm/cm$^2$·sec·cmHg (measured by Seikaken method) of oxygen permeability coefficient and outer layers made of the other thermoplastic resin having smaller water absorption than that of the inner layer.

3 Claims, No Drawings

PROCESSED MEAT PACKAGING TUBE AND METHOD OF PACKAGING

BACKGROUND OF THE INVENTION

1. Field of the Invention

The present invention relates to a tube for packaging a processed meat such as ham and sausage and a method of packaging the processed meat.

2. Description of the Prior Arts

In a packaging of a processed meat such as ham and sausage, a ground meat is processed by seasoning, blending and ageing etc. to prepare a processed meat and the processed meat is filled in a tube of a film having high oxygen barrier property made of polyvinylidene chloride etc. and the processed meat filled in the tube is boiled at 80° to 90° C. for several minutes to several hours and quenched to prepare the product.

The film for packaging the processed meat should have high oxygen barrier property and should maintain a tightening modulus for pressing the inner processed meat (hereinafter the property for maintaining the tightening modulus is referred to as tightening property) even after the boiling and quenching step.

Heretofore, various films for packaging a processed meat have been developed. However, a film having both of satisfactory tightening property and satisfactory oxygen barrier property has not been commercialized and the development of such film has been needed.

The characteristics required for a processed meat packaging tube will be described in detail.

In an insertion of the processed meat into the tube, it is preferable to use a film having enough rigidity in order to improve a processibility for filling the processed meat into the tube. On the other hand, it is necessary to use a film having a strength to be durable under the weight of the processed meat and the pressure for filling the processed meat into the tube.

In the boiling step, it is necessary to use a tube having high shrinking property required for closely contacting and tightening the processed meat filled in the tube. Moreover, it is necessary to use a tube which is durable in the boiling treatment. The processed meat is expanded by the boiling treatment. It is necessary to use a tube having enough strength under the expanding pressure. It is also necessary to use a tube having high shape sustaining property so as to prevent excess elongation and a deformation caused by a softening.

In the quenching step, the boiled processed meat filled in the tube is dipped into a coolant water to quench it and then the product is usually stored at lower than 10° C.

In the quenching operation, the processed meat is contracted.

When only the processed meat is contracted but the tube is not shrinked, a slack of the film is caused to deteriorate the appearance of the product and moreover, a liquid component of the processed meat is separated and filled in the cavities whereby the storage life is significantly lowered.

Thus, the tube should shrink depending upon the contraction of the processed meat and it should impart the tightening property for tightening the processed meat even at lower temperature.

Heretofore, it has been proposed to use a film made of rubber hydrochloride, polyvinylidene chloride. However, the rubber hydrochloride film has not enough oxygen barrier property and enough strength. The polyvinylidene chloride film has not enough rigidity and has low processibility and has not enough tube break resistance and shape sustaining property because of a decrease of strength in the boiling step.

SUMMARY OF THE INVENTION

It is an object of the present invention to provide a processed meat packaging tube which has the above-mentioned advantages and has not the disadvantages of a tube break and a deformation of the package and imparts suitable tightening characteristic and high processability.

It is another object of the present invention to provide a method of packaging a processed meat which imparts suitable appearance without a separation of a liquid component in cavities of the packed processed meat.

The forgoing and other objects of the present invention have been attained by providing a processed meat packaging tube which is prepared by tubing an orientated laminated film having more than 5% of a shrinkage coefficient at 80° C., less than ±5% of percent elongation-shrinkage at 80° C. under tensile modulus of 20 Kg/cm$^2$ and more than 8 Kg/cm$^2$ of a tightening modulus at 5° C. and more than $1.0 \times 10^3$ Kg/cm$^2$ of a tensile modulus of elasticity at 80° C. which is formed by stretching a composite film having an inner or a middle layer made of an oxygen thermoplastic resin having less than $1 \times 10^{-11}$ cc·cm/cm$^2$·sec·ccHg (measured by Seikaken method) of oxygen permeability coefficient and an outer layer made of the other thermoplastic resin having smaller water absorption than that of the inner layer.

DETAILED DESCRIPTION OF THE PREFERRED EMBODIMENTS

The oxygen barrier thermoplastic resins used as the barrier layer have less than $1 \times 10^{-11}$ cc·cm/cm$^2$·sec·cmHg (measured by Seikaken method) of oxygen permeability coefficient such as polyamide, polyethyleneterephthalate, hydrolyzed ethylene-vinylacetate copolymer and polyvinyl alcohol, etc.

When the oxygen permeability coefficient is higher than the limit, the rate of permeation of oxygen is too much whereby it is not suitable for a storage of the processed meat.

In order to give the satisfactory oxygen permeability coefficient (less than 4 cc/m$^2$·h·atm measured by ASTM D-1434), the thickness of the film should be thick to cause adverse effects to the other characteristics and to cause high cost.

The thermoplastic resins of the outer layers which have smaller water absorption than that of the inner layer, and which are used by combining with the oxygen barrier thermoplastic resin of the inner layer should be the orientatable by stretching the film to provide the following characteristics such as polyethylene, ethylene-vinyl acetate copolymer, polybutene-1 and crosslinked polyethylene, etc.

The thermoplastic resins having smaller water absorption preferably have the water absorption of less than 0.5% measured by ASTM-D-570 and typical ones include polyethylene-vinyl acetate copolymer, polybutene-1 or crosslinked polyethylene.

When the water absorption is higher than 0.5%, the outer layers absorbs water during a storage to cause peeling of the orientated laminated film.

It is optimum to use the oxygen barrier thermoplastic resin layer as the inner layer and to use the thermoplastic resin layers having smaller water absorption than that of the inner layer as both of the outer layers in the lamination because the oxygen barrier thermoplastic resin layer is protected from the damage, the water-absorption and the peeling to be significantly advantageous for a storage of a processed meat.

The shrinkage, the percent elongation-shrinkage, the strain and the tensile modulus of elasticity, are as follows.

The running direction of the laminated film is referred to as a vertical direction and the perpendicular direction thereof is referred to as a transversal direction.

The shrinkage coefficient and the percent elongation-shrinkage are given by the equations:

$$\text{Shrinkage coefficient} = \frac{L - L_1}{L} \times 100(\%)$$

$$\text{Percent elongation-shrinkage} = \frac{L_2 - L}{L} \times 100(\%)$$

wherein the reference L designates a distance between two reference points in each direction at room temperature; L designates a distance between the reference points after heating it at 80° C. for 5 minutes under non-load; and $L_2$ designates a distance between two reference points after heating it at 80° C. for 5 minutes under a load of 20 Kg/cm².

The orientated laminated film is held on a frame at room temperature to prevent a shrinkage and is dipped in a hot water at 80° C. for 1 hour and then, it is dipped in a cold water at 5° C. and after 1 hour, the stress retained in the orientated laminated film is measured.

This corresponds to the condition straining a processed meat by a packaging tube when the processed meat is filled in the packaging tube and the tube is sealed and the processed meat is boiled and quenched and stored. This is referred to as a strain.

The strain is measured at 5° C. as the vertical tension.

The tensile modulus of elasticity is measured from an inclination of a linear part of stress-strain curve at lifting up where the relation of stress and strain is measured under stretching the orientated laminated film at a constant speed of 500 mm/min at 80° C. by a tensile tester.

In the method of packaging the processed meat according to the present invention, the processed meat is filled in the packaging tube prepared by tubing an orientated laminated film and the tube is sealed and boiled and quenched.

In order to improve the processibility in filling the processed meat, the inner diameter of the packaging film is slightly larger than the outer diameter of the processed meat.

The filling inlet is sealed by a fitting and the product is boiled to cause a heat shrinkage so as to tighten the filled processed meat. Accordingly, the shrinkage coefficient at 80° C. should be higher than 5%. When it is less than 5%, it is difficult to give enough gap between the inner diameter of the packaging tube and the outer diameter of the processed meat so as to be easily inserted. When it is inserted with a small gap, the processibility is too low to package in an industrial operation. Moreover, the shrinkage coefficient of the film is not enough in the boiling step after sealing the tube whereby it is difficult to tighten the processed meat by the tube whereby a slack and a slip of the packaging tube are caused and a liquid component is separated in cavities disadvantageously.

In order to maintain the tightening modulus to the processed meat, the shrinkage coefficient, the percent elongation-shrinkage and the tightening modulus are important factors.

That is, it is necessary to be less than ±5% preferably less than ±3% of the shrinkage coefficients (the vertical direction and the transversal direction) and higher than 8 Kg/cm² of the tightening modulus at 5° C.

When the shrinkage coefficient (the vertical direction and the transversal direction) is higher than −5%, (as absolute datum) the stress of the film in the boiling step is too high whereby the heat sealed part, the fitting sealed part or the weak part of the film is easily broken. On the other hand, when the shrinkage coefficient is higher than +5%, the film is easily elongated in the boiling step and the tube is locally elongated or deformed to deteriorate the product value since the processed meat is not uniformly filled.

The processed meat is expanded and contracted in the boiling-quenching steps. Accordingly, the tube should follow to the expansion and contraction. The elongation and shrinkage corresponding to the expansion and contraction of the processed meat is not enough and it is important to have the straining characteristic for tightening the processed meat by the packaging tube after the quenching.

When the processed meat contains a liquid component, the tightning characteristic is especially important.

When the straining characteristic is weak, the separation of the liquid component is easily caused to deteriorate the storing life. Accordingly, it is necessary to have more than 8 Kg/cm² of the tightening modulus at 5° C.

When the strain is lower, the straining characteristic is weak. The processed meat package such as ham and sausage should have relatively long life in the storage. During the storage, the stress of the tube is gradually released to be lower retained shrinkage and the appearance of the product after the storage is deteriorated.

The tensile modulus of elasticity at 80° C. (vertical direction and transversal direction) should be higher than $1.0 \times 10^3$ Kg/cm².

The tensile modulus of elasticity shows the fundamental characteristic of the mechanical strength and the rigidity of the film and it decreases depending upon the increase of temperature.

When the tensile modulus of elasticity at 80° C. is lower than 1.0 Kg/cm², the strength is too low and sometimes the tube is broken by the expansion of the processed meat in the boiling step. Moreover, high elongation is caused by the expansion of the processed meat and the shape of the packed product is deformed to be irregular. When many packed products are dipped in a hot water vessel in the boiling step, sometimes the tubes may be broken by the mutual contacts of the packed products and the contacts of the fittings for sealing.

When the tensile modulus of elasticity at 80° C. is higher than $1.0 \times 10^3$ Kg/cm², the tensile modulus of elasticity at room temperature is higher. Accordingly, the rigidity of the tube is enough high to easily carrying out the filling operation. The processed meat packaging tube has the characteristics of the shrinkage coefficient, the percent elongation-shrinkage under tensile stress, the tightening modulus and the tensile modulus of elasticity whereby the packaging tube is suitable for all of the steps of filling the processed meat, sealing, boiling and quenching it and the product is suitable for a long storage and commercialization.

When one of these characteristics is lost, the trouble in the corresponding step is caused and a consideration for overcoming the trouble is needed. As the result, the productibity is lowered or the special equipment or tool is required or the lost of the raw material is caused to be uneconomical.

The processed meat packaging tube having such characteristics can not be obtained by using a single layer film.

Such characteristics can be attained by orientating a composite film having an inner layer made of a high oxygen barrier thermoplastic resin and outer layers made of the other thermoplastic resin having smaller water absorption than that of the inner layer.

That is, the characteristics can be imparted by synergistic effect of the lamination and the orientation.

In order to obtain the orientated laminated film having high oxygen barrier characteristic and suitable tightening modulus for the processed meat such as ham and sausage, a nonorientated laminated film is formed by a coextrusion of the oxygen barrier thermoplastic resin as inner layer and the other thermoplastic resin having smaller water absorption as outer layers or by a coextrusion of a tubular inflation film having an inner layer of the oxygen barrier thermoplastic resin and an outer layer of the other thermoplastic resin having smaller water absorption through an annular die and a press-bonding of the tubular inflation film with or without a binder, or an extrusion lamination or a dry lamination of said resin layers if necessary with printing, or a press-bonding of said resin films under an activation, and the resulting laminated film is orientated at higher than the second order transition temperatures of both of the resins and lower than the melting points of both of the resins by stretching biaxial directions at a ratio of longitudinal stretching rate to that of transversal stretching rate of 0.5 to 2.0 and at a product of the longitudinal stretching rate to the transversal stretching rate of 4 to 50. The biaxial orientation can be the simultaneous orientation or the sequential orientation.

In order to obtain the oriented laminated film having said characteristics, the combinations of the resins for the lamination, the thicknesses of layers and the ratio of the thicknesses, the condition of lamination, the temperature in stretching and the stretching rate are decided by a person skilled in the art.

The total thickness of the orientated laminated film is preferably less than 300$\mu$ especially less than 100$\mu$. A ratio of the thickness of the inner layer to the total thickness is preferably in a range of 5 to 60% especially 10 to 50%.

The characteristics of the packaging tube are attained by mutually affecting the molecular structures of the resins, the condition in the stretching, the molecular orientation effect, and the combination thereof.

The combinations can be easily considered by a person skilled in the art and it is not easy to describe all of the combinations because of volumes of descriptions and accordingly the description is simplified. These combinations for imparting the required characteristics can be easily understood by simple experiments as described above.

The processed meat packaging tube is prepared by tubing the orientated laminated film having the above-defined characteristics of the shrinkage coefficient, the percent elongation-shrinkage under tensile stress, the tightening modulus and the tensile modulus of elasticity and excellent oxygen barrier characteristic.

The packaging tube is suitable for the steps of filling, boiling, quenching and storing in the packaging process for the processed meat such as ham and sausage and the storing life of the product is long.

The processed meat packaging tube of the present invention is formed by combining the barrier layer of the inner or middle layer and the orientatable outer layer and orientating the laminated film under the synergistic effect by the biaxial stretching to combine excellent functions of the layers whereby the optimum characteristics for the processed meat packaging tube are imparted.

The present invention will be further illustrated by four examples and five references, however the combinations of the present invention are not limited by the examples.

EXAMPLES AND REFERENCES

Each resin for the outer layer and each resin for the inner layer were respectively melt-extruded to form films and the resulting films were bonded by each bonding method shown in Table 1 to prepare each laminated film. The laminated film was orientated by the biaxial stretching shown in Table 1 to obtain each orientated laminated film having the thickness, the structure and the combination shown in Table 1.

Each shrinkage coefficient, percent elongation-shrinkage, tightening modulus and tensile modulus of elasticity of each orientated laminated film are shown in Table 1. A tube was prepared by tubing each orientated laminated film and the following processed meat was filled in each tube and the end of the tube was sealed with a fitting.

| Size of tube: | diameter: | 5 cm |
|---|---|---|
| | length (in seal): | 18 cm |
| Composition of processed meat: | | |
| | ham (pork, seasoning, etc.) 350 g/case | |

100 Packaged samples for each kind of the orientated laminated film were prepared.

The samples were boiled at 85° C. for 2 hours and then immediately quenched in water at 5° C. A number of the broken samples was measured.

After the treatment, the samples were stored in the condition of 5° C. and 70% of a relative humidity for 1 month and the appearance was observed.

The results are shown in Table 1.

In the Table, the resins used for preparing the film are shown by the following references.

6 PA: 6-nylon: a second order transition temperature (hereinafter referring to as $T_g$) of 42° C.; a melting point (hereinafter referring to as $T_M$) of 220° C.; oxygen permeability coefficient of $1.9 \times 10^{-12}$ cc·cm/cm$^2$·sec·cmHg.; water absorption of 3.21%.

PET: polyethyleneterephthalate: $T_g$ of 69° C.; $T_M$ of 260° C.: oxygen permeability coefficient of $1.6 \times 10^{-11}$ cc·cm/cm$^2$·sec·cmHg.; water absorption of 1.9%.

EVAOH: hydrolyzed ethylene-vinyl acetate copolymer: (ethylene content: 33 mole %) $T_g$ of 74° C.; $T_M$ of 180° C.; oxygen permeability coefficient of $6\times10^{-14}$ cc·cm/cm²·sec·cmHg.; water absorption of 6.18%.

EEA: ethylene-ethyl acrylate copolymer: $T_g$ of $-75°$ C.; $T_M$ of 150° C.; water absorption of 0.1%.

PB-1: polybutene-1: $T_g$ of $-20°$ C.; $T_M$ of 126° C.; water absorption of 0.09%.

EVA: ethylene-vinyl acetate copolymer (vinyl acetate content 5 wt. %): $T_g$ of 20° C.; $T_M$ of 105° C.; water absorption of 0.1%.

LDPE: low density polyethylene: $T_g$ of $-20°$ C.; $T_M$ of 115° C.; water absorption of 0.06%.

PVC: polyvinyl chloride containing plasticizer of 10 wt. %: $T_g$ of 87° C.; $T_M$ of 212° C.; water absorption of 0.3%.

In Table 1, the sample No. 1 to 4 had the characteristics of the present invention and no break of the tube was found in the boiling and quenching treatment and the appearances of the samples after the storage were excellent.

The samples No. 5 to 9 had the characteristics out of the present invention had defect appearances after the storage and certain break of the tubes were found in the boiling and quenching treatment.

What is claimed is:

1. A method of packaging a processed meat which comprises filling a processed meat into a tube of an oriented, laminated film having a shrinkage coefficient at 80° C. of more than 5%, less than ±5% elongation-shrinkage at 80° C. under tensile modulus of 20 Kg/cm² and a tightening modulus at 5° C. of more than 8 Kg/cm² and a tensile modulus of elasticity at 80° C. of more than $1.0\times10^3$ Kg/cm² which is formed by stretching a composite film having an inner layer of an oxygen barrier thermoplastic resin having an oxygen permeability coefficient of less than $1\times10^{-11}$ cc·cm/cm²·sec·cm Hg sandwiched between outer layers of a thermoplastic resin having a smaller water absorbtion capability than that of the inner layer, with less than 5% of a space between the tube and the processed meat and sealing the tube with a fitting and heating and quenching the processed meat sealed in the tube, wherein the oxygen barrier thermoplastic resin layer is selected from the group consisting of polyamide, polyethyleneterephthalate, hydrolized ethylene-vinylacetate copolymer and polyvinyl alcohol and wherein the thermoplastic resin of lesser water absorption capability is selected from the group consisting of polyethylene, ethylene-vinylacetate Table 1

| Sample No. | Structure | Thickness of layers after stretching | Preparation | Shrinkage coefficient (%) | Percent elongation stretching (%) | Tightening modulus (Kg/cm²) | Tensile modulus |
|---|---|---|---|---|---|---|---|
| 1 | EVA/6PA/EVA | 15/10/15 | The films were bonded under ozone treatment and simultaneously stretched in 3 times × 3 times (long × trans.) at 85° C. | 34 | 0 | 12 | 1.6 |
| 2 | LDPE/6PA/LDPE | | The films were bonded with adhesive agent and simultaneously stretched in 2.5 times × 2.5 times (long × trans.) at 95° C. | 20 | 0 | 8.5 | 1.3 |
| 3 | LDPE/EVAOH/LDPE | 15/10/15 | The films were bonded with adhesive agent and simultaneously stretched in 3 times × 3 times (long × trans.) at 90° C. | 23 | 2.1 | 11.0 | 1.8 |
| 4 | EEA/PET/PB-1 | 20/10/20 | The films were bonded with adhesive agent and simultaneously stretched in 3.5 times × 3.5 times (long × trans.) at 90° C. and then heat-treated at 120° C. | 6 | −1.8 | 8.3 | 1.9 |
| 5 | EEA/PET/PB-1 | 20/10/20 | The process of (4) was repeated except heat-treating at 85° C. | 3 | −2 | 8.1 | 1.8 |
| 6 | EEA/PET/PB-1 | 30/5/20 | The process of (4) was repeated without post-heat-treatment. | 18 | 6 | 10.1 | 1.1 |
| 7 | EEA/PET/PB-1 | 10/20/10 | The process of (6) was repeated. | 10 | −4 | 7.0 | 2.4 |
| 8 | EVA/6PA/EVA | 20/2/20 | The process of (1) was repeated. | 40 | 4.0 | 10.8 | 0.6 |
| 9 | EEA/PVC/PB-1 | 20/10/20 | The films were bonded with adhesive agent and simultaneously stretched in 2 times × 2 times (long × trans.) at 90° C. | 21 | 1 | 8.1 | 0.8 |

| Sample No. | Appearance after storage | Broken tube (number) |
|---|---|---|
| 1 | Excellent | 0 |
| 2 | Excellent | 0 |
| 3 | Excellent | 0 |
| 4 | Excellent (low shrinkage coefficient) | 0 |
| 5 | The contact of tube with the processed meat was not close and the liquid component was separated in cavities. (high percent elongation) | 0 |
| 6 | The appearance after quenching was inferior. (low tightening modulus) | 0 |
| 7 | The film was not shrinked enough to follow contraction of the processed meat. The film is not tightened. (low tensile modulus of elasticity) | 0 |
| 8 | Good appearance many tubes were broken in the quenching. | 13 |
| 9 | The same with (8). | 8 | copolymer, polybutene-1 and cross-linked polyethylene.

2. The method according to claim 1, wherein the total thickness of the oriented laminated film is less than 300 microns and the ratio of the thickness of the inner layer to the total thickness is from 10 to 50%.

3. The method according to claim 1, wherein the oxygen barrier thermoplastic resin is 6-nylon and said thermoplastic resin of lesser water absorption capability is selected from the group consisting of ethylene-vinylacetate copolymer and low density polyethylene.

* * * * *